(12) United States Patent
Pan

(10) Patent No.: US 11,170,628 B2
(45) Date of Patent: Nov. 9, 2021

(54) MONITORING DEVICE

(71) Applicant: CHANNEL WELL TECHNOLOGY CO., LTD., Taoyuan (TW)

(72) Inventor: Yi-An Pan, Taoyuan (TW)

(73) Assignee: NORTHWEST INSTRUMENT INC., Dover, NJ (US)

( * ) Notice: Subject to any disclaimer, the term of this patent is extended or adjusted under 35 U.S.C. 154(b) by 271 days.

(21) Appl. No.: 16/207,253

(22) Filed: Dec. 3, 2018

(65) Prior Publication Data

US 2020/0152042 A1 May 14, 2020

(30) Foreign Application Priority Data

Nov. 9, 2018 (TW) ................................ 107215276

(51) Int. Cl.
*G08B 21/18* (2006.01)
*G08B 19/00* (2006.01)

(52) U.S. Cl.
CPC ........... *G08B 21/182* (2013.01); *G08B 19/00* (2013.01)

(58) Field of Classification Search
CPC ...... G08B 21/182; G08B 19/00; G08B 21/18; G08B 7/06; B01D 46/0086; B01D 46/46; B01D 46/10; B01D 46/444; B01D 46/0043; B01D 2279/45; G01N 15/0806; G01N 2015/084
USPC ........................................................ 340/521
See application file for complete search history.

(56) References Cited

U.S. PATENT DOCUMENTS

| 6,145,098 | A | * | 11/2000 | Nouri | G06F 21/31 714/31 |
| 2008/0310967 | A1 | * | 12/2008 | Franz | F04D 27/004 417/32 |
| 2010/0117969 | A1 | * | 5/2010 | Shih | G06F 1/181 345/173 |
| 2011/0187943 | A1 | * | 8/2011 | Cox | H04N 5/64 348/789 |

* cited by examiner

*Primary Examiner* — Joseph H Feild
*Assistant Examiner* — Sharmin Akhter
(74) *Attorney, Agent, or Firm* — Anova Law Group, PLLC

(57) ABSTRACT

Disclosures of the present invention describe a monitoring device, consisting of a signal receiving unit, a detecting module, a main controller module, a display module, and a plurality of buttons, wherein the signal receiving unit is electrically connected to an electronic device through an electrical connector. Particularly, a user can operate the main controller module, by pressing or rotating one of the plurality buttons, to transmit at least one operation information to the display module, so as to show the operation information on the display module. Moreover, in the case of an operation parameter of at least one electronic element in the electronic device being detected to exceed a threshold value, the detecting module informs the main controller module to show at least one warning signal on the display module, such that the user is aware of noting the operation state of the electronic device.

13 Claims, 13 Drawing Sheets

MONITORING DEVICE

BACKGROUND OF THE INVENTION

1. Field of the Invention

The present invention relates to technology filed of monitoring devices for monitoring electronic elements, and more particularly to a monitoring device.

2. Description of the Prior Art

With advancement of science and technology, electronic devices are demanded increasing their functionality and efficiency, and that leads the electronic device to be installed with more and more extra electronic elements and/or components therein. For instance, currently commercial computer cases, keyboards, and mice have been installed with lighting elements and/or flash units for increasing visual effects thereof. It is extrapolated that, however, it needs to correspondingly increase power and heat dissipating efficiency of the electronic device with respect to the adding of one or more extra electronic elements and/or components.

However, the adding of one or more extra electronic elements and/or components may cause the occurrences of over load, over current, and/or over temperature in the electronic device. In spite of most of currently commercial electronic devices having been provided with over-current, over-load and over-temperature protection units, these protection units are commonly configured to interrupt power from providing to the electronic device, or to achieve a down regulation of the power consumption of the electronic device. Engineers skilled in design and manufacture of electronic devices should know, the above-mentioned conventional protection mechanisms provided by protection units may impair the electronic elements and/or components in the electronic device, and that would also decrease a service life of the electronic device. Seriously, the increased temperature may further lead the electronic device to be subject to spontaneous combustion.

Through above descriptions, it is known that the conventional monitoring device integrated with protection units still show drawbacks and shortcomings in practical uses or applications. In view of that, inventors of the present application have made great efforts to make inventive research thereon and eventually provided a monitoring device.

SUMMARY OF THE INVENTION

The primary objective of the present invention is to provide a monitoring device, comprising: a signal receiving unit electrically connected to an electronic device, a main controller module, a display module, and plurality of buttons. Particularly, a user can operate the main controller module, by pressing or rotating one of the plurality buttons, to transmit at least one operation information to the display module, so as to show the operation information on the display module. Moreover, in the case of an operation value of at least one electronic element in the electronic device being detected to exceed a threshold value, the detecting module informs the main controller module to show at least one warning signal on the display module, such that the user is aware of noting operation states of the electronic device. Briefly speaking, the monitoring device of the present invention is helpful for the user to conveniently monitor the operations states of the electronic device through the operation information and/or the warning signal shown on the display module. As a result, the user can adjust related operation parameters of the electronic device based on the current operations states of the electronic device.

For achieving the primary objective of the present invention, the inventor of the present invention provides an embodiment for the monitoring device, comprising:

a signal receiving unit, being electrically connected to an electronic device through an electrical connector;

a detecting module, being electrically connected to the signal receiving unit for detecting at least one operation information of at least one electronic element disposed in the electronic device;

a main controller module, being electrically connected to the signal receiving unit and the detecting module, and being configured for receiving the at least one operation information through the signal receiving unit and the detecting module;

a display module, being electrically connected to the main controller module;

a plurality of buttons, being electrically connected to the main controller module;

wherein by pressing one of the plurality of buttons, the main controller module controlling the display module to display the at least one operation information;

wherein the main controller module receives a warning signal from the detecting module in the case of at least one operation parameter of the at least one electronic element being found to exceed a threshold value, such that the main controller module controls the display module to display the warning signal.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a monitoring device, embodiments of the present invention will be described in detail with reference to the attached drawings hereinafter.

First Embodiment

Figure 1:
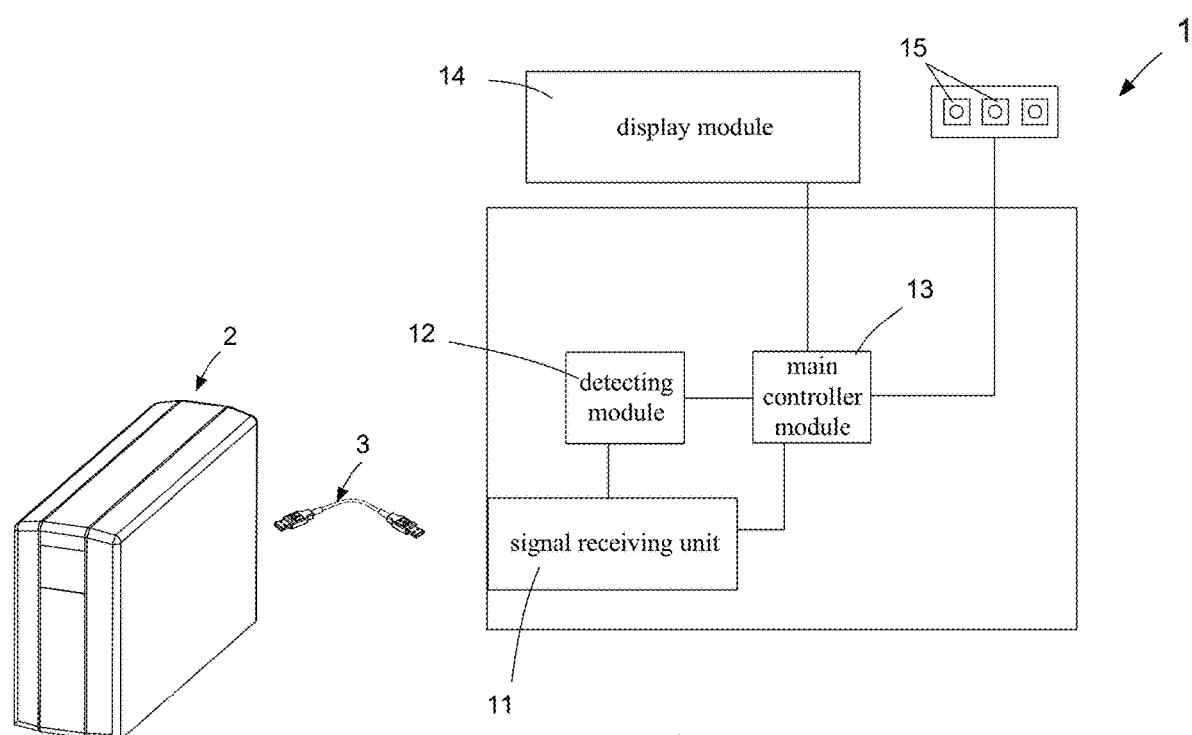
FIG. 1 shows a first circuit block diagram of a first embodiment of a monitoring device according to the present invention.

With reference to FIG. 1, there is provided a first circuit block diagram of a first embodiment of a monitoring device according to the present invention. As FIG. 1 shows, the monitoring device 1 of the present invention mainly comprises a signal receiving unit 11, a detecting module 12, a main controller module 13, a display module 14, and a plurality of buttons 15. From FIG. 1, it is understood that the signal receiving unit 11 is electrically connected to an electronic device 2 through an electrical connector 3, and the detecting module 12 is electrically connected to the signal receiving unit 11 for detecting at least one operation information of at least one electronic element disposed in the electronic device 2. Moreover, the main controller module 13 is electrically connected to the signal receiving unit 11 and the detecting module 12 for receiving the at least one operation information through the signal receiving unit 11 and the detecting module 12. It needs to further explain that, the display module 14 is electrically connected to the main controller module 13, and the plurality of buttons 15 are also electrically connected to the main controller module 13. By such arrangements, the main controller module 13 is configured to transmit the at least one operation information to the display module 14 after one of the plurality of buttons 15 is pressed, such that the at least one operation information is displayed on the display module 14. It is worth noting that, the main controller module 13 receives a warning signal from the detecting module 12 in the case of at least one operation parameter of the at least one electronic element being found to exceed a threshold value, such that the main controller module 13 controls the display module 14 to display the warning signal.

Figure 2:
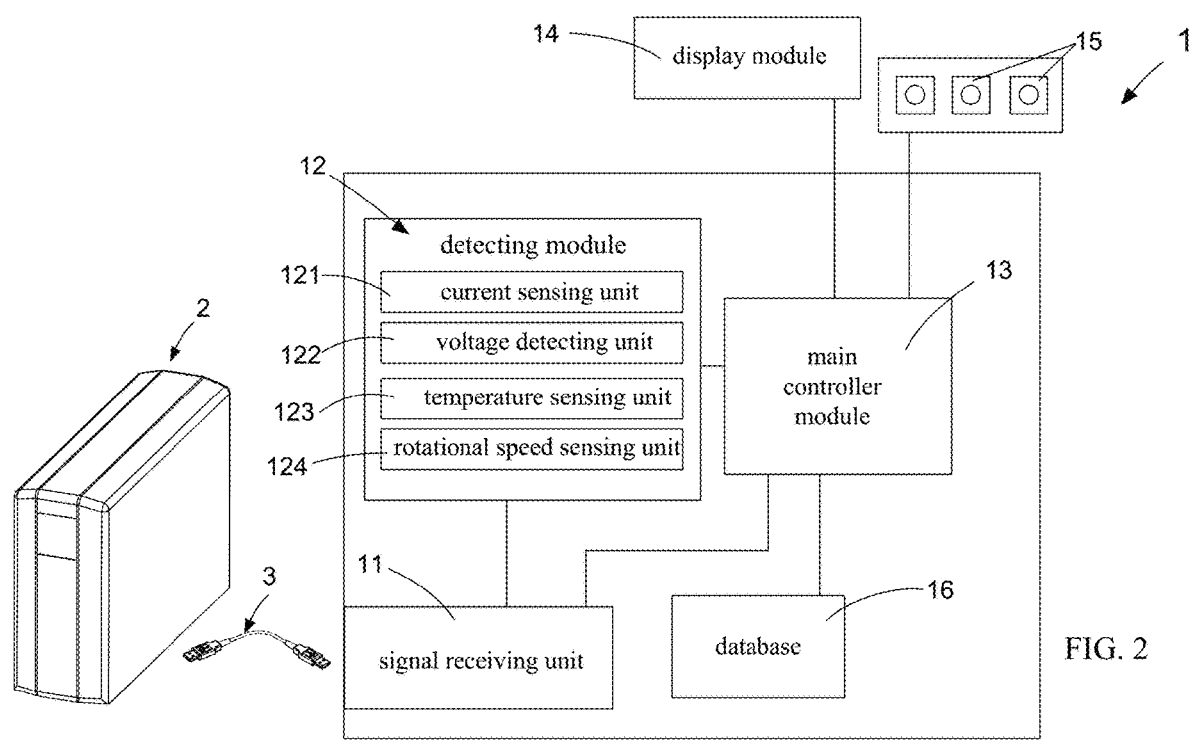
FIG. 2 shows a second circuit block diagram of the first embodiment of the monitoring device.
Figure 3:
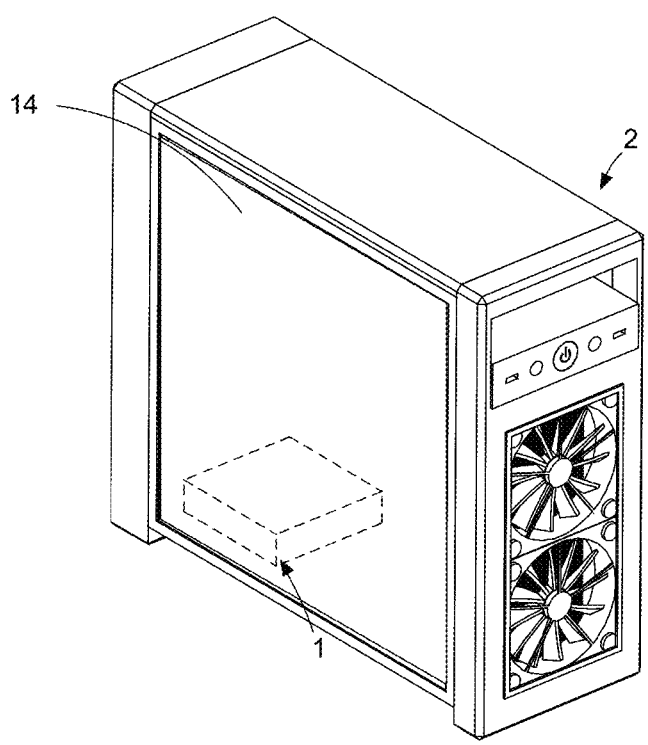
FIG. 3 shows a schematic stereo diagram of the first embodiment of the monitoring device.

Following on with reference to FIG. 2, which shows a second circuit block diagram of the first embodiment of the monitoring device. Moreover, please simultaneously refer to FIG. 3 showing a schematic diagram of the first embodiment. FIG. 2 and FIG. 3 depict that the detecting module 12 comprises: a current sensing unit 121, a voltage detecting unit 122, and a temperature sensing unit 123, wherein the current sensing unit 121 is disposed in the electronic device 2, and is electrically connected to the main controller module 13 for detecting a current value of the at least one electronic element. Moreover, the voltage detecting unit 122 is disposed in the electronic device 2, and is electrically connected to the main controller module 13 for detecting a voltage value of the at least one electronic element. Briefly speaking, the monitoring device 1 of the present invention is capable of monitoring the (output) current value, the (output) voltage value and an output power of the electronic device 2. Besides, the temperature sensing unit 123 is disposed in the electronic device 2, and is electrically connected to the main controller module 13 for sensing a temperature of the at least one electronic element. More detailedly, one of the electronic element is a heat-dissipation fan, and the detecting module 12 further comprises a rotational speed sensing unit 124 disposed in the electronic device 2. FIG. 2 depicts that the rotational speed sensing unit 124 is electrically connected to the main controller module 13 for sensing a rotational speed of the heat-dissipation fan. According to FIG. 3, it is able to know that, the monitoring device 1 is capable of being integrated into the electronic device 2. In the first embodiment of the monitoring device 1, the display module 14 is a non-touch display module.

Following on from the previous descriptions, the aforesaid operation information is selected from the group consisting of name of manufacture company of the electronic device, logo of manufacture company of the electronic device, system arrangement of the electronic device, power usage state of the electronic device, output voltage of the electronic device 2, output current of the electronic device 2, output power of the electronic device, temperature of the at least one electronic element in the electronic device 2, working state of at least one fan disposed in the electronic device, and working state of at least one lighting unit disposed in the electronic device. Therefore, by the assistance of the monitoring device 1 of the present invention, a user is capable of knowing an information of the electronic device's manufacture company as well as the operation information of the electronic device 2. In addition, the warning signal is selected from the group consisting of temperature warning signal, over-voltage warning signal, over-current warning signal, over-power warning signal, abnormality warning signal, overload warning signal, and a combination of any two or above signals. According to particular design of the present invention, the user is able to conveniently monitor operation states of the electronic device 2, and further monitor a functionality and efficiency of the electronic device 2.

Second Embodiment

Figure 4:
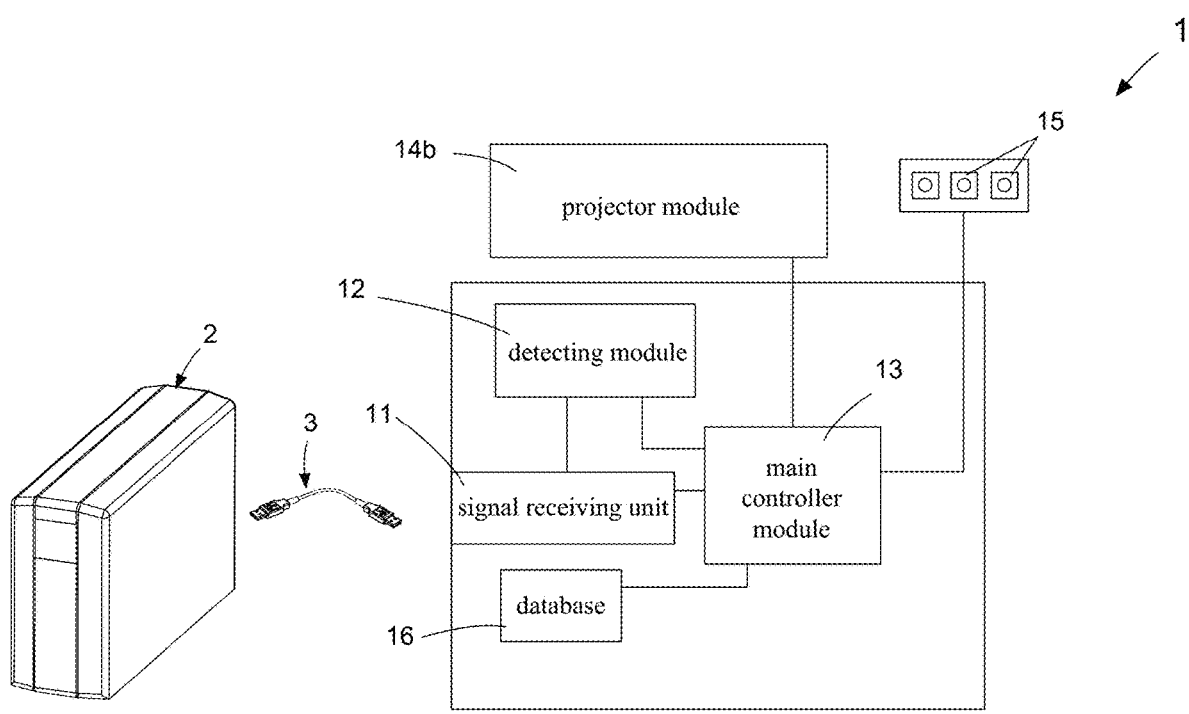
FIG. 4 shows a first circuit block diagram of a second embodiment of the monitoring device.
Figure 5:
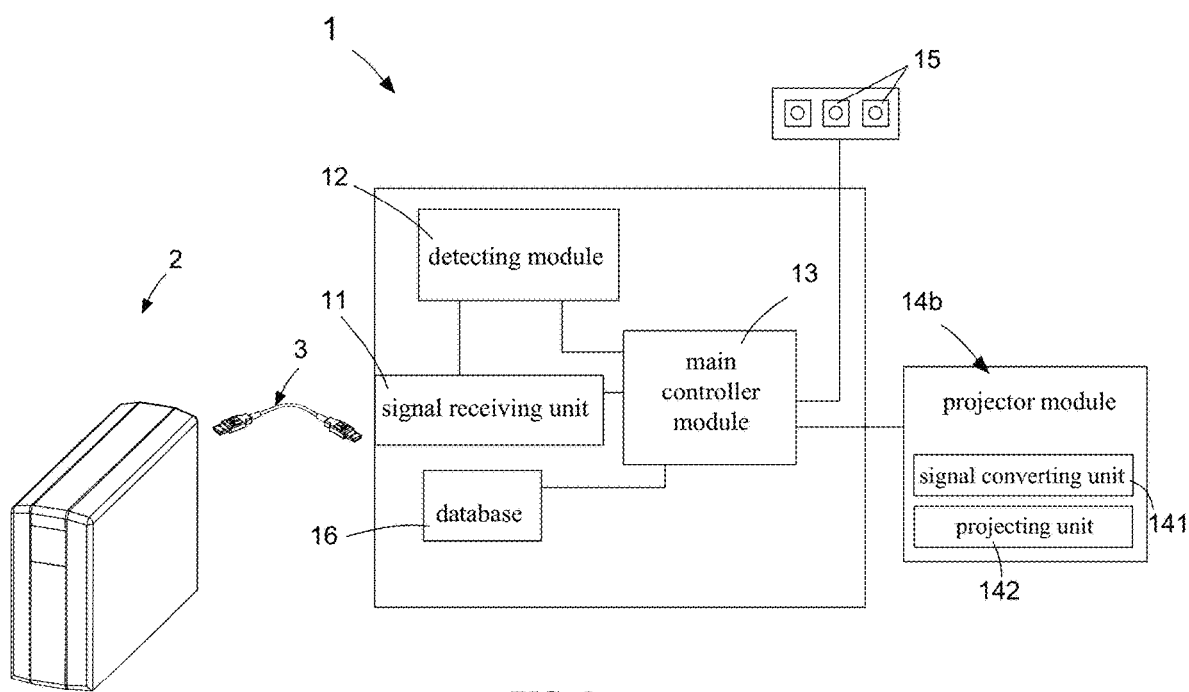
FIG. 5 shows a second circuit block diagram of the second embodiment of the monitoring device.

Please refer to FIG. 4, which shows a first circuit block diagram of a second embodiment of the monitoring device. And simultaneously refer to FIG. 5, which illustrates a second diagram of a first demonstration of the second embodiment of the monitoring device. From FIG. 4 and FIG. 5, it is understood that, the second embodiment of the monitoring device 1 further comprises a database 16 electrically connected to the main controller module 13 for storing the operation information, the warning signal, at least one record of the warning signal, the threshold value, at least one connection information between the signal receiving unit and the main controller module, at least one gesture table, sound data for using in the warning signal, connection list, and fingerprint data. After comparing FIG. 1 with FIG. 4, it is able to know that a projector module 14b is particularly adopted, in the second embodiment, for being as the display module 14. More detailedly, the projector module 14b comprises a signal converting unit 141 and a projecting unit 142, wherein the signal converting unit 141 is electrically connected to the main controller module 13 for converting the operation information to a graphic image signal.

Figure 6:
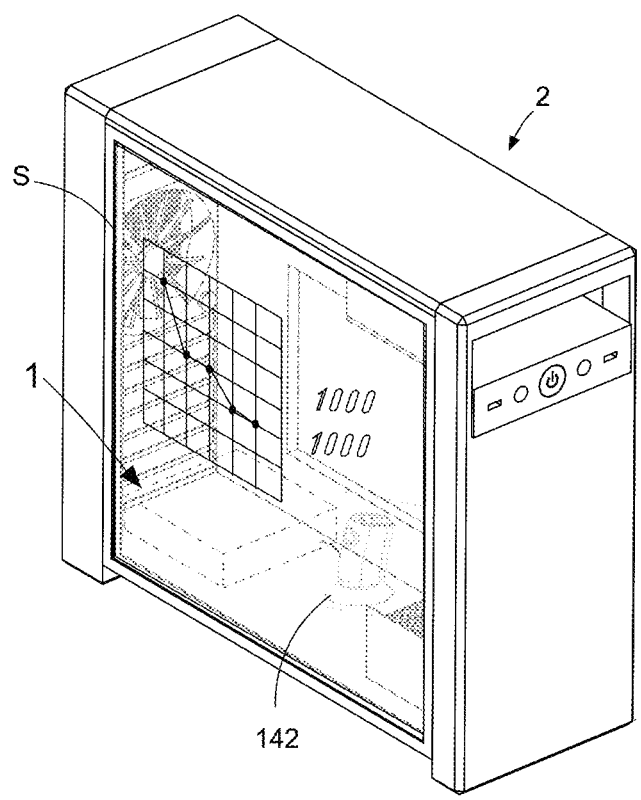
FIG. 6 shows a schematic stereo diagram of a first demonstration of the second embodiment of the monitoring device.

Referring to FIG. 4 and FIG. 5 again, and please simultaneously refer to FIG. 6, which shows a schematic stereo diagram of a first demonstration of the second embodiment of the monitoring device. It is worth explaining that, the projecting unit 142 is electrically connected to the signal converting unit 141 for carrying out an image projection process based on the graphic image signal. As FIG. 6 shows, the projecting unit 142 is disposed in the electronic device 2, and is configured for projecting an image on a case of the electronic device 2 based on the graphic image signal. On the other words, a screen S is installed on one side of the case of the electronic device 2, in order to show the image by a projection of the projecting unit 142.

Figure 7:
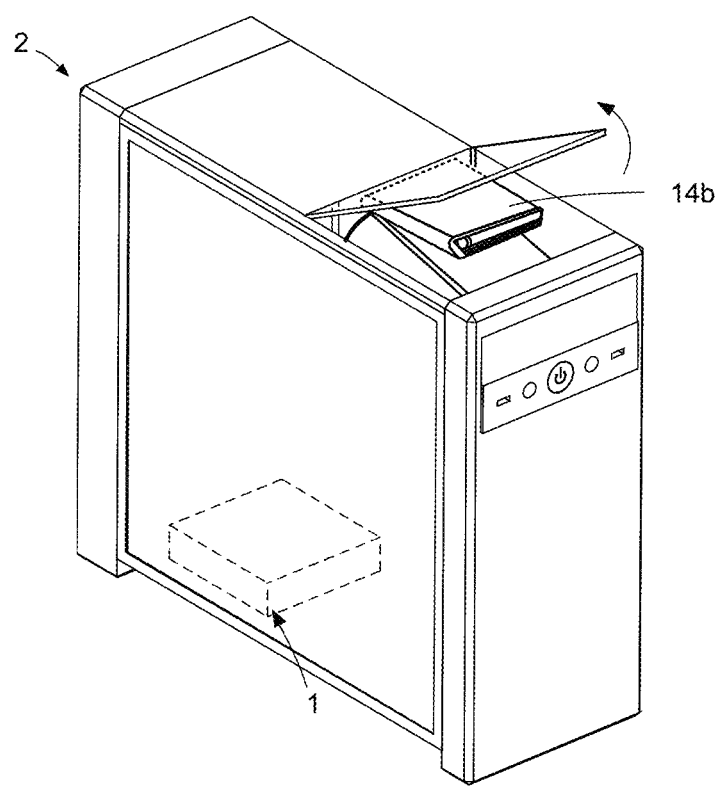
FIG. 7 shows a schematic stereo diagram of a second demonstration of the second embodiment of the monitoring device.

Please refer to FIG. 7, which shows a first circuit block diagram of a second embodiment of the monitoring device. And simultaneously refer to FIG. 5, which illustrates a schematic stereo diagram of a second demonstration of the second embodiment of the monitoring device. As FIG. 7 shows, the projecting unit 142 is disposed in the electronic device 2 and exposes out of the electronic device 2 through an opening of the case of the electronic device 2. Moreover, it is optional to further add a clamshell platform design on the case of the electronic device 2 for facilitating the projecting unit 142 be hided in the case by covering the opening, or exposing the projecting unit 142 out of the case by showing the opening.

Figure 8:
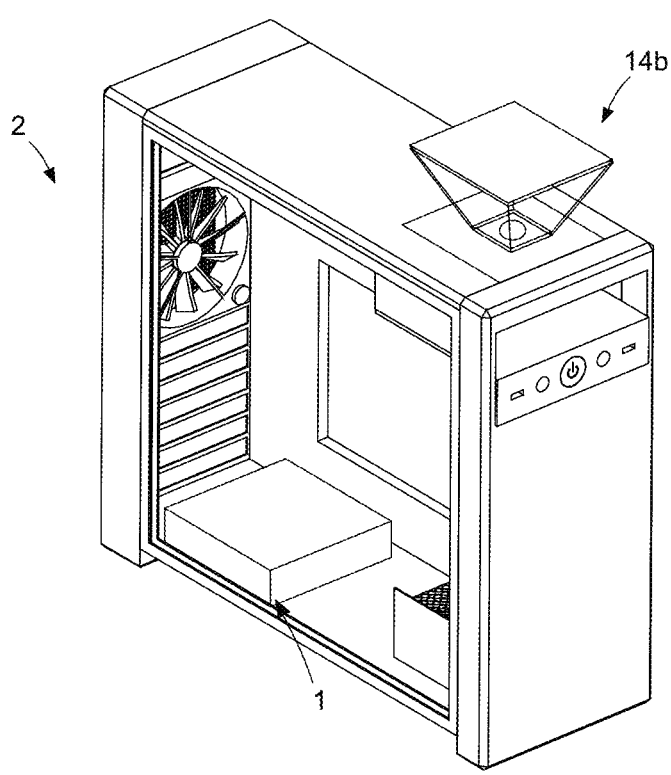
FIG. 8 shows a schematic stereo diagram of a third demonstration of the second embodiment of the monitoring device.

Refereeing to FIG. 5 again, and please simultaneously refer to FIG. 8, which shows a schematic stereo diagram of a third demonstration of the second embodiment of the monitoring device. From FIG. 8, it is found that, the projector module 14*b* further comprises a plurality of transparent sheets, such that the projecting unit 142 is able to project the image on the plurality of transparent sheets for carrying out the image projection of the operation information.

Figure 9:
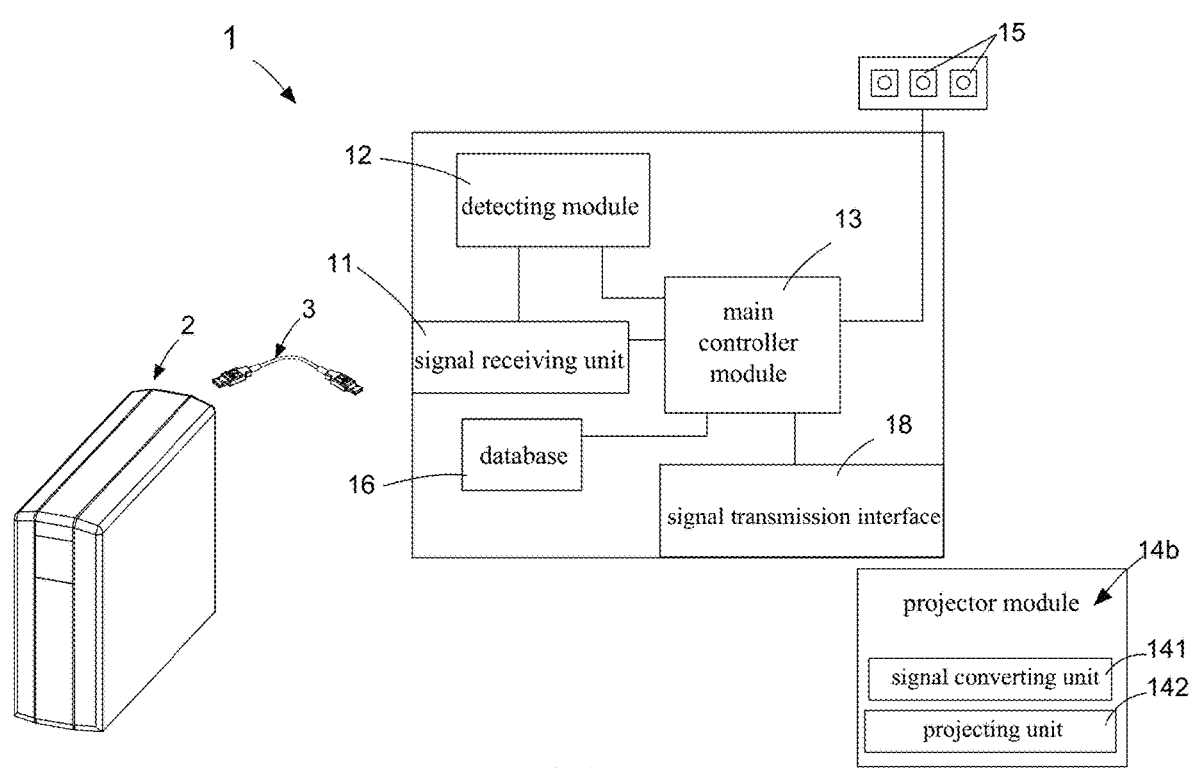
FIG. 9 shows a third circuit block diagram of the second embodiment of the monitoring device.

FIG. 9 illustrates a third circuit block diagram of the second embodiment of the monitoring device. As FIG. 9 shows, the monitoring device 1 further comprises a signal transmission interface 18, which is electrically connected to the main controller module 13, and is configured for making the projecting unit 14*b* communicate with the main controller module 13.

Third Embodiment

Figure 10:
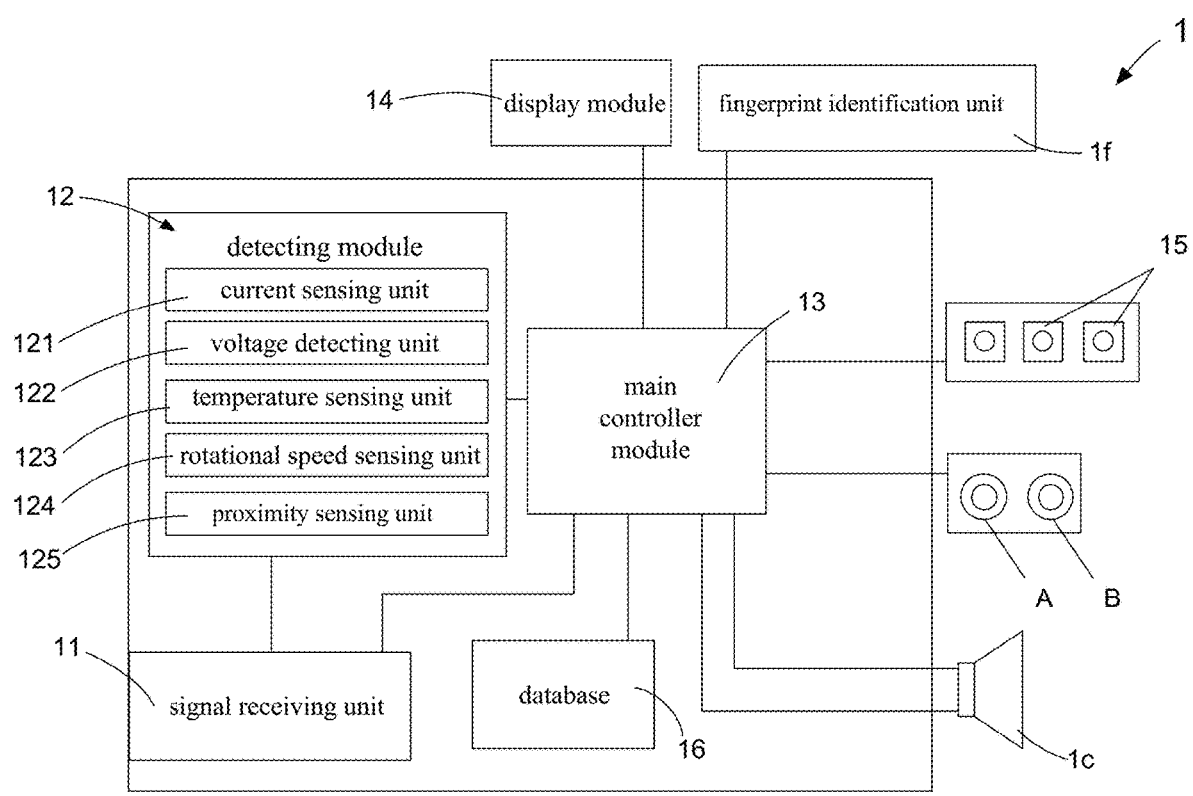
FIG. 10 shows a circuit block diagram of a third embodiment of the monitoring device.

Following on with reference to FIG. 10, which shows a circuit block diagram of a third embodiment of the monitoring device. After comparing FIG. 2 with FIG. 10, it is able to know that, a power button A, a reset button B, a proximity sensing unit 125, a case, a speaker unit 1*c*, and a fingerprint identification unit 1*f* are added into the framework of the monitoring device 1. The power button A is coupled to the main controller module 13. Therefore, by pressing the power button A, the main controller module 13 switches the electronic device 2 to be turned on or turned off. Moreover, the reset button B is coupled to the main controller module 13, and is configured to reboot the electronic device 2 through the main controller module 13 after being pressed thereof. It is worth explaining that, the user can drive the main controller module 13 to adjust the operation parameter(s) of the at least one electronic element by pressing the buttons 15, so as to monitor and/or control the electronic element disposed in the electronic device 2. For instance, the user can adjust the rotational speed of the heat-dissipation fan, a color tone or a light frequency of the lighting unit, by pressing the plurality of corresponding buttons.

Figure 11:
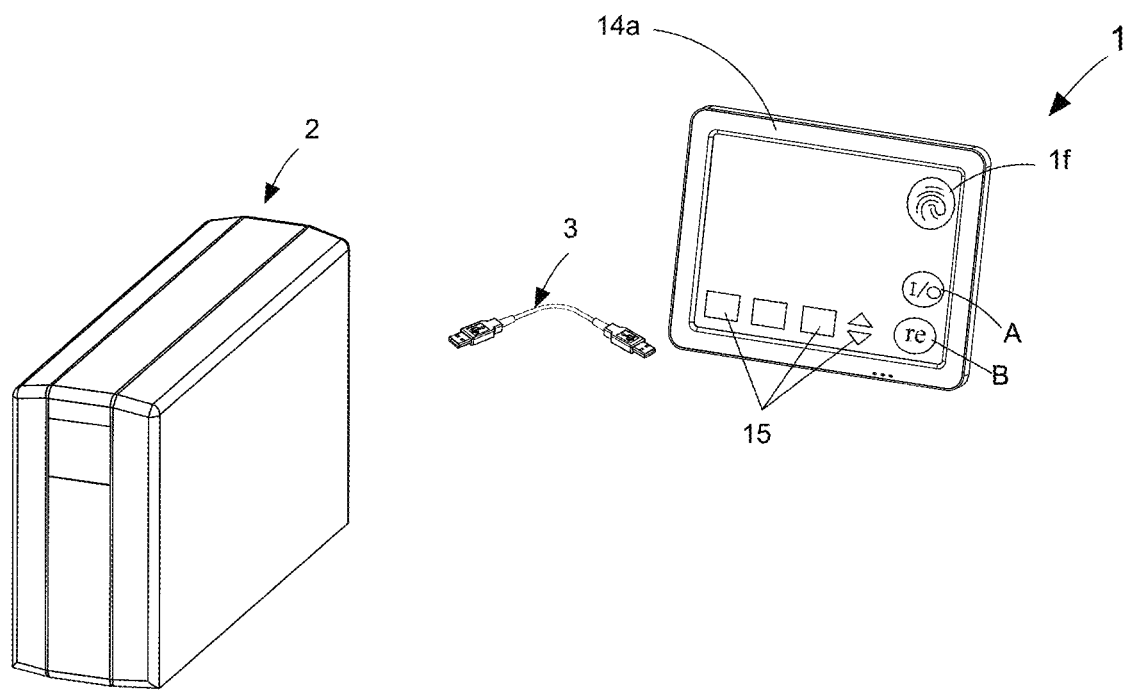
FIG. 11 shows a first stereo diagram of the third embodiment of the monitoring device.

Referring to FIG. 10 again, and please simultaneously refer to FIG. 11, which shows a first stereo diagram of the third embodiment of the monitoring device. As FIG. 11 shows, the display module 14 is a touch display module, and is integrated with the plurality of buttons 15 therein. Moreover, the fingerprint identification unit 1*f* is electrically connected to the main controller module 13. Therefore, after a finger puts on the fingerprint identification unit 1*f*, the fingerprint identification unit 1*f* identifies and transmits a fingerprint signal of the finger to the main controller module 13. More detailedly, the main controller module 13 compares the fingerprint signal with fingerprint data and gesture table pre-stored in the data base 16, so as to transmits a corresponding control instruction to the electronic device 2. In addition, the case is used to accommodate the signal receiving unit 11, the detecting module 12, and the main controller module 13.

Figure 12:
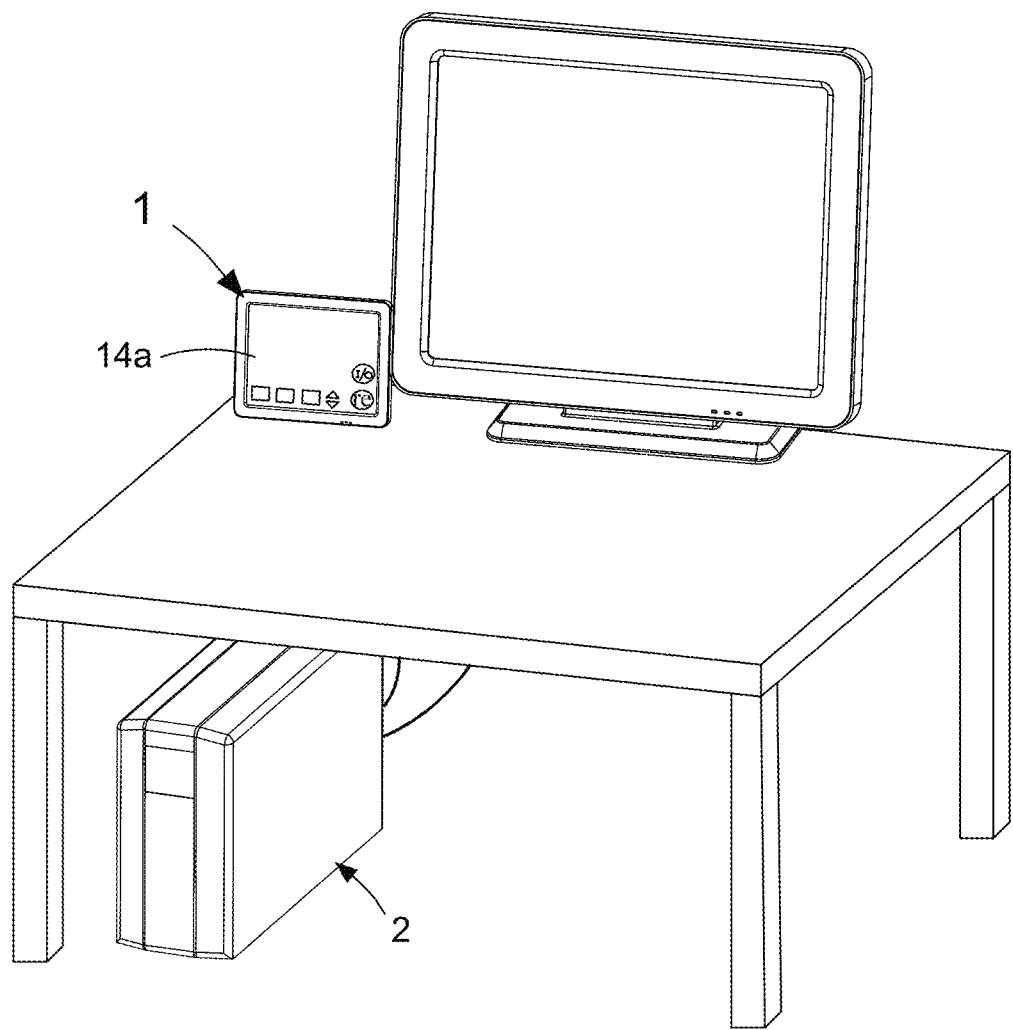
FIG. 12 shows a second stereo diagram of the third embodiment of the monitoring device.
Figure 13:
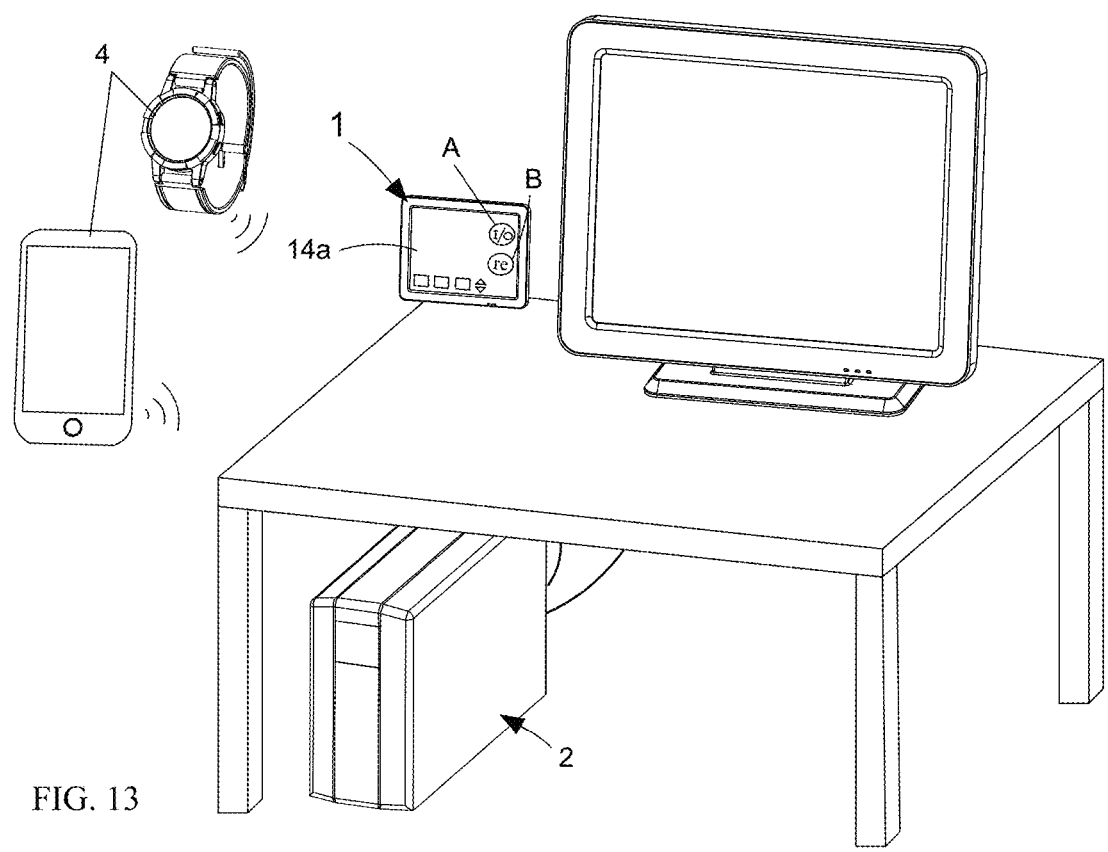
FIG. 13 shows a third stereo diagram of the third embodiment of the monitoring device.

On the other hand, FIG. 12 shows a second stereo diagram of the third embodiment of the monitoring device, and FIG. 13 shows a third stereo diagram of the third embodiment of the monitoring device. In the present invention, the proximity sensing unit 125 is electrically connected to the main controller module 13, and is configured to transmit a boot signal to the main controller module 13 in the case of sensing an approach of a mobile device 4, such that the main controller module 13 transmits a corresponding control instruction to the mobile device 4 after referring the connection list stored in the database 16. In other words, the proximity sensing unit 125 senses the permitted mobile device 4 to boot the monitoring device 2 and/or the electronic device 2. Moreover, when finding that the operation information of at least one electronic element exceeds the threshold value, the speaker unit 1*c* is electrically connected to the main controller module 13 for broadcasting the sound data carried by the warning signal. From FIG. 13, it is also understood that the main controller module 13 controls the electronic device 2 to be turned on, turned off, or rebooted under the power button A or the reset button B is pressed. As explained earlier, the user can switch the electronic device 2 to be turned on, turned off or reboot, so as to a turn on button, a turn off button, and a reset button B of the electronic device 2 can be removed from the case of the electronic device 2 during manufacturing process.

Through above descriptions, the monitoring device 1 of the present invention has been introduced completely and clearly; in summary, the present invention includes the advantages of (1) The present invention particularly discloses a monitoring device 1, consisting of a signal receiving unit 11, a detecting module 12, a main controller module 13, a display module 14, and a plurality of buttons 15, wherein, the signal receiving unit 11 is electrically connected to an electronic device 2. In the present invention, by pressing or rotating one of the plurality of buttons 15 a user can operate the detecting module 12 transmitting an operation information and a usage state of at least one electronic element disposed in the electronic device 2 to the display module 14. It is worth explaining that, in the case of an operation value of the at least one electronic element being detected to exceed a threshold value, the detecting module 12 informs the main controller module 13 to show at least one warming signal on the display module 14, such that to remain and to show the user of the operation information and usage state of the monitoring device 1. Briefly speaking, the user is able to conveniently monitor a usage state and the operation information of the electronic device 2 by the monitoring device 1 of the present invention. Moreover, the user can adjust the operation value of the electronic device 2 according to a usage state of the electronic device 2.

(2) According to particular designed of the present invention of the monitoring device 1, the user can switch the electronic device 2 to be turned on, turned off or reboot the electronic device 2 by a power button A and/or a reset button B of the monitoring device 1, such that a power button A and/or a reset button B of the electronic device 2 can be removed from a case of the electronic device 2 during manufacturing process, so as to reduce manufacturing cost of the electronic device 2.

The above description is made on embodiments of the present invention. However, the embodiments are not intended to limit scope of the present invention, and all equivalent implementations or alterations within the spirit of the present invention still fall within the scope of the present invention.

What is claimed is:

1. A monitoring device, being applied for achieving a parameter monitoring of an electronic device, and comprising:
    a display;
    a main controller, being electrically connected to the display, and being coupled to the electronic device through an electrical connector;
    a database, being electrically connected to the main controller, and storing an operation information, a warning signal, at least one record of the warning signal, at least one threshold value, at least one connection information between the electrical connector and the main controller, at least one gesture table, a sound data carried by the warning signal, a connection list, and at least one fingerprint data;
    wherein the main controller comprises a plurality of embedded programs including instructions for:
    determining whether at least one operation parameter received from at least one electronic element disposed in the electronic device through the electrical connector exceeds the corresponding threshold value or not;
    outputting one warning signal in the case of the at least one operation parameter exceeding the corresponding threshold value; and
    showing one operation information including the at least one operation parameter on the display.

2. The monitoring device of claim 1, wherein the plurality of embedded programs further include instructions for:
    monitoring a current value of the at least one electronic element;
    monitoring a voltage value of the at least one electronic element;
    monitoring a temperature of the at least one electronic element; and
    monitoring a rotational speed of the at least one electronic element.

3. The monitoring device of claim 1, being capable of being integrated into the electronic device.

4. The monitoring device of claim 1, wherein the operation information is selected from the group consisting of name of manufacture company of the electronic device, logo of manufacture company of the electronic device, system arrangement of the electronic device, power usage state of the electronic device, output voltage of the electronic device, output current of the electronic device, output power of the electronic device, temperature of the at least one electronic element in the electronic device, working state of at least one fan disposed in the electronic device, and working state of at least one lighting unit disposed in the electronic device.

5. The monitoring device of claim 1, wherein the warning signal is selected from the group consisting of temperature warning signal, over-voltage warning signal, over-current warning signal, over-power warning signal, abnormality warning signal, overload warning signal, and a combination of any two or above signals.

6. The monitoring device of claim 1, further comprising a projector electrically connected to the main controller, and the projector comprising at least one embedded program including instructions for:
    converting the operation information received from the main controller to a graphic image signal; and
    projecting an image including the operation information on a projector screen according to the graphic image signal.

7. The monitoring device of claim 6, wherein the projector and the projector screen are integrated in the electronic device, and the projector screen is made to be a side plate of a casing of the electronic device.

8. The monitoring device of claim 6, wherein the projector is integrated in the electronic device, and a casing of the electronic device is provided with an opening thereon for making a lens of the projector be exposed out of the electronic device, thereby allowing the projector to project the image on the projection screen through the opening.

9. The monitoring device of claim 6, further comprising:
    a signal transmission interface, being electrically connected between the main controller and the projector.

10. The monitoring device of claim 1, further comprising a plurality of buttons electrically connected to the main controller, and the plurality of buttons comprising:
    a power button, being coupled to the main controller; wherein by pressing the power button, the main controller switching the electronic device to be turned on or turned off, and
    a reset button, being coupled to the main controller; wherein by pressing the reset button, the main controller rebooting the electronic devices.

11. The monitoring device of claim 1, wherein the display is a touch display, and being integrated with the plurality of buttons therein.

12. The monitoring device of claim 1, further comprising:
    a proximity sensor, being electrically connected to the main controller; wherein in case of a mobile device being close to the proximity sensor, the main controller being activated by the proximity sensor to boot the electronic device.

13. The monitoring device of claim 1, further comprising:
    a speaker, being electrically connected to the main controller, and the plurality of embedded programs further including instructions for: controlling the speaker to broadcast a sound according to the sound data in case of the warning signal being outputted.

* * * * *